(12) United States Patent
Bhattacharya et al.

(10) Patent No.: US 7,925,453 B2
(45) Date of Patent: Apr. 12, 2011

(54) ASSESSING CONDITIONS OF AIRCRAFT WIRING

(75) Inventors: Ashok K. Bhattacharya, Federal Way, WA (US); Ingrid Lapins, Renton, WA (US); Phung Dinh Pham, Renton, WA (US); Douglas D. Saltarelli, Enumclaw, WA (US)

(73) Assignee: The Boeing Company, Chicago, IL (US)

( * ) Notice: Subject to any disclaimer, the term of this patent is extended or adjusted under 35 U.S.C. 154(b) by 264 days.

(21) Appl. No.: 12/106,151

(22) Filed: Apr. 18, 2008

(65) Prior Publication Data

US 2009/0265119 A1 Oct. 22, 2009

(51) Int. Cl.
*G06F 19/00* (2006.01)
(52) U.S. Cl. ........................................................ 702/34
(58) Field of Classification Search ..................... 702/34
See application file for complete search history.

(56) References Cited

U.S. PATENT DOCUMENTS 7,536,284 B2  5/2009 Linzey et al.

OTHER PUBLICATIONS

W. G. Linzey, Development of an Electrical Wire Interconnect System Risk Assessment Tool, Sep. 2006, p. 1-34.*
Enhanced Airworthiness Program for Airplane Systems/Fuel Tank Safety (EAPAS/FTS); Federal Register/vol. 72, No. 216, Dated Thursday, Nov. 8, 2007; pp. 63364-63414.
Proposed Rules; Federal Register/vol. 70, No. 193, Dated Oct. 6, 2005; pp. 58548-58552.
Notice of Proposed Amendment (NPA) No. 2007-01; European Aviation Safety Agency (EASA); pp. 1-148.
Hasson, Jeff et al. "Boeing's Safety Assessment Processes For Commercial Airplane Designs", AIAA/IEEE Digital Avionics Systems Conference—Proceedings 1997 IEEE, vol. 1, 1997, pp. 4.4-1-4.4-4, XP002540691.
Mazzuchi, Thomas A. et al. "A Paired Comparison Experiment for Gathering Expert Judgment For An Aircraft Wiring Risk Assessment", Reliability Engineering and System Safety, Elsevier Applied Science, GB, vol. 93, No. 5, Mar. 16, 2007, pp. 722-731, XP022424831.

\* cited by examiner

*Primary Examiner* — Tung S Lau
(74) *Attorney, Agent, or Firm* — Harness, Dickey & Pierce, P.L.C.

(57) ABSTRACT

A method of assessing potential conditions affecting aircraft electrical wiring systems. Electrical wiring system components potentially affected by a potential failure condition of the aircraft are identified. Probabilistic and/or statistical methods are used to determine exposure of one or more wire segments of the identified component(s) to hazard and whether the exposure meets a predetermined safety threshold. Effects of potential failure modes of the identified segment(s) on a system safety assessment for the electrical wiring systems are evaluated. This method can be used to facilitate compliance with aircraft safety regulations.

17 Claims, 9 Drawing Sheets

Functional Airplane Wiring System Safety Assessment Summary

Condition:

Reference: xxxxxx

Failure Mode:

| Wire Diagram | Wire Bundle/ Equipment | Wire Number | Wire Failure Effect (a) Effect on wire system (b) Effect on System (c) Effect on Airplane | | | Failure Criteria | Classification | Mitigation |
|---|---|---|---|---|---|---|---|---|
| | | | Wire Failure: 1. Short to ground 2. Short to power 3. Short to other wires in bundles | | | 1. System/component level review 2. Common geometry/wire count thresholds 3. Statistical rates | | |
| | | | 1 | 2 | 3 | | | |
| ATA-XX-YY | X9999 | XXXXXX | (a) Wire fail open no power/signal (b) No effect (c) No effect | (a) Wire fail open no power/signal (b) No effect (c) No effect | (a) Potential shorting of wire/C/B open (b) Potential failure of non-essential or redundant systems (c) None | Does not meet failure criteria | Minor | Analysis indicates wire fails safe |
| ATA-XX-YY | X9900 | YYYYY | NA | NA | NA | Wire meets geometry thresholds and statistical reliability rates (Criteria 2 and 3) | Minor | |
| ATA-XX-YY | X9900 | ZZZZ | (a) Wire fail open no power/signal (b) No effect (c) No effect | (a) Wire fail open no power/signal (b) No effect (c) No effect | (a) Potential shorting of wire (b) Valve fails to open - System inoperative (c) Loss of control | Does not meet failure criteria | Catastrophic | Design Change |

ASSESSING CONDITIONS OF AIRCRAFT WIRING

FIELD

The present disclosure relates generally to wiring on aircraft and more particularly (but not exclusively) to assessing conditions of aircraft wiring, e.g., for aircraft certification.

BACKGROUND

The statements in this section merely provide background information related to the present disclosure and may not constitute prior art.

Aircraft safety has long been the subject of governmental regulation. Federal Aviation Administration (FAA) rules governing the airworthiness of transport aircraft include safety standards for aircraft design, production, operation, and maintenance. Electrical wiring systems are among the aircraft systems for which safety standards are specified.

SUMMARY

The present disclosure, in one implementation, is directed to a method of assessing potential conditions affecting electrical wiring systems of an aircraft. One or more electrical wiring system components potentially affected by a potential failure condition of the aircraft is identified. One or more probabilistic and/or statistical methods are used to determine exposure of one or more wire segments of the identified component(s) to hazard and whether the exposure meets a predetermined safety threshold. The method includes evaluating effects of one or more potential failure modes of the identified segment(s) on a system safety assessment for the electrical wiring systems.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5 is a functional safety assessment form in accordance with one implementation of the present disclosure.

DETAILED DESCRIPTION

The following description is merely exemplary in nature and is not intended to limit the present disclosure, application, or uses.

The present disclosure, in one implementation, is directed to a method in which one or more enterprise-based databases relating to aircraft wiring and wiring installation are utilized in performing a safety analysis of aircraft wiring. In various implementations, physical and/or mechanical failures of aircraft wiring systems and related components are addressed, along with potential effects of such failures on aircraft systems and functionality. In some implementations, safety analysis may be performed in order to document compliance with federal safety regulations applicable to aircraft certification.

Until recently, federal regulations did not treat aircraft wiring as a discrete system. Wiring systems tended to be addressed, for example, in the context of implicating a single wire in a potential failure condition for a system that included the wire. It should be noted that current certification regulations are addressed to electrical wiring interconnect systems (EWISs) at a system level. It also should be noted, however, that the present disclosure is not limited to implementations relating to aircraft certification. Implementations also are contemplated in which potential conditions affecting aircraft electrical wiring systems are assessed apart from or incidental to an aircraft certification process. Implementations also are contemplated that have no connection to aircraft certification. Electrical wiring system safety could be assessed, e.g., in order to improve wiring systems maintenance procedures and/or other aspects of aircraft operation.

Figure 1:
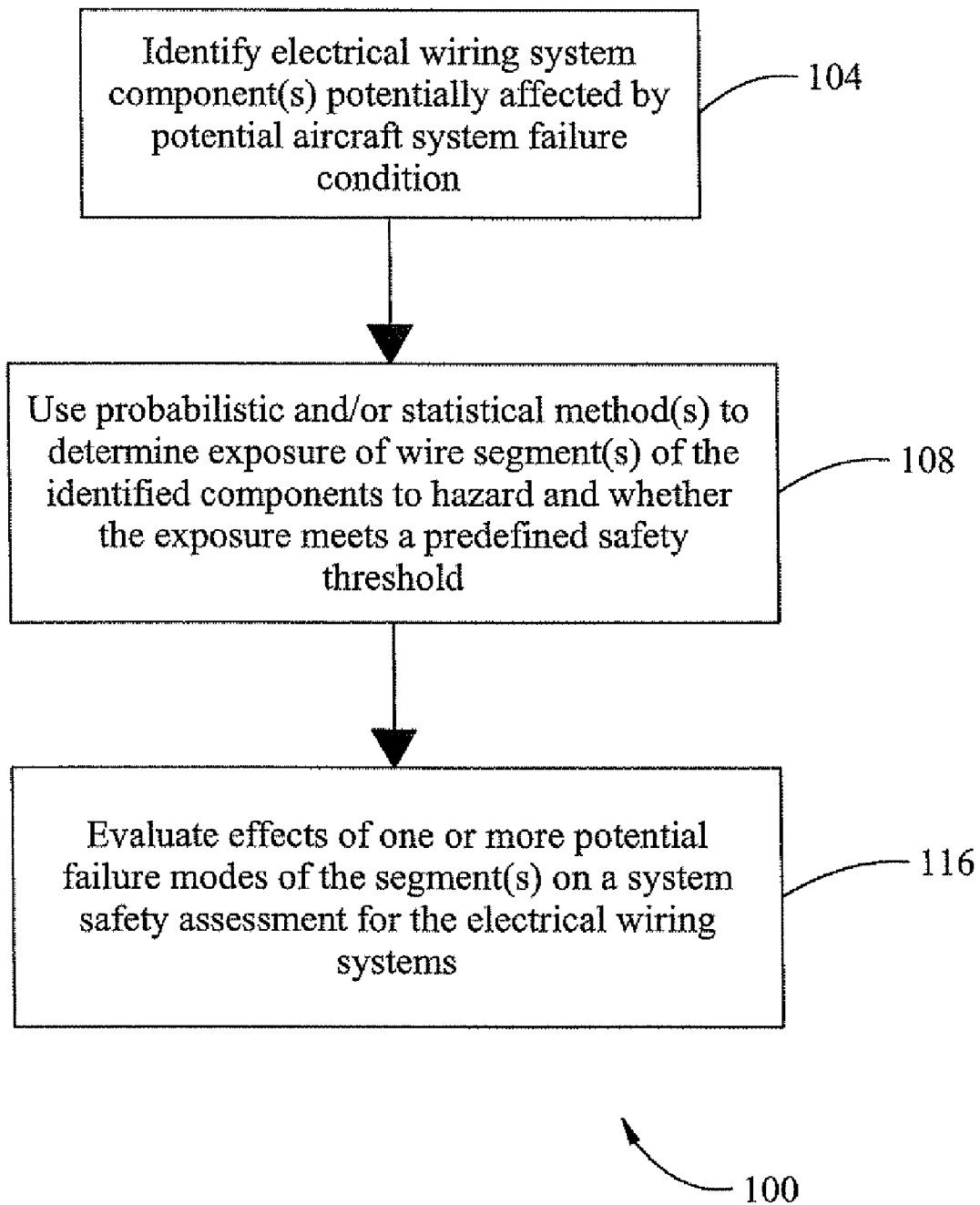
FIG. 1 is a flow diagram of a method of assessing potential conditions affecting aircraft electrical wiring systems in accordance with one implementation of the present disclosure.

One implementation of a method of assessing potential conditions affecting electrical wiring systems of an aircraft is indicated generally in FIG. 1 by reference number 100. The method 100 may be performed, for example, in connection with obtaining certification of an aircraft. In process 104, one or more electrical system components potentially affected by a potential system failure condition of the aircraft are identified. The potential failure condition may be, e.g., a hypothetical failure condition defined for use in performing an aircraft-level functional hazard assessment (FHA) for the aircraft. Such a failure condition may be defined, e.g., as a condition that would prevent the continued safe flight and landing (CSFL) of the aircraft. Other or additional specifications of failure conditions may be obtained from other or additional sources, e.g., from engineering drawing review, laboratory or aircraft testing, in-service experience of aircraft operations or incidents, and/or accident investigations.

In process 108, one or more probabilistic and/or statistical methods are used to determine exposure of one or more wire segments of the system(s)/component(s) under consideration to hazard and whether the exposure meets a predefined safety threshold. Conditions constituting "hazard" may be defined by applicable regulation and/or safety assessment methods. Additionally or alternatively, "hazard" may be defined to include other or additional conditions. For example, hazards may be defined by industry standards, in-service aircraft experience, and/or product requirements development and definition. In various implementations and as further described below, an exposure level of an item in question may be determined, e.g., using quantitative probabilistic and statistical methods and/or qualitative assessments based on analysis and/or inspection.

A process 116 includes evaluating effects of one or more failure modes of the identified segment(s) on a system safety assessment (SSA) for the electrical wiring systems. It should be noted generally that the term "process" may be used in the disclosure and claims to refer to a single operation or a plurality of operations. It also should be noted generally that performance of processes as described in the disclosure and claims is not always necessarily sequential.

In various implementations of the present disclosure, quantitative methods may be used to determine whether or not an exposure of an electrical wiring system component to hazard is a safety concern. For example, probabilistic methods may be used to determine potential threat and exposure levels. Exposures of electrical wiring system components may be geometrically defined using nearest-neighbor types of methodologies and/or combinatorial/permutational mathematical approaches. Such approaches can include consideration of wire and/or wire bundle geometries in radial and/or transverse directions and development of probabilistic quantitative assessments of hazard effects. Probability density functions may be used which may be generated from algorithms applied to large databases. Additionally or alternatively, statistical methods may be employed that use failure rate data extracted from in-service aircraft experience.

Figure 2:
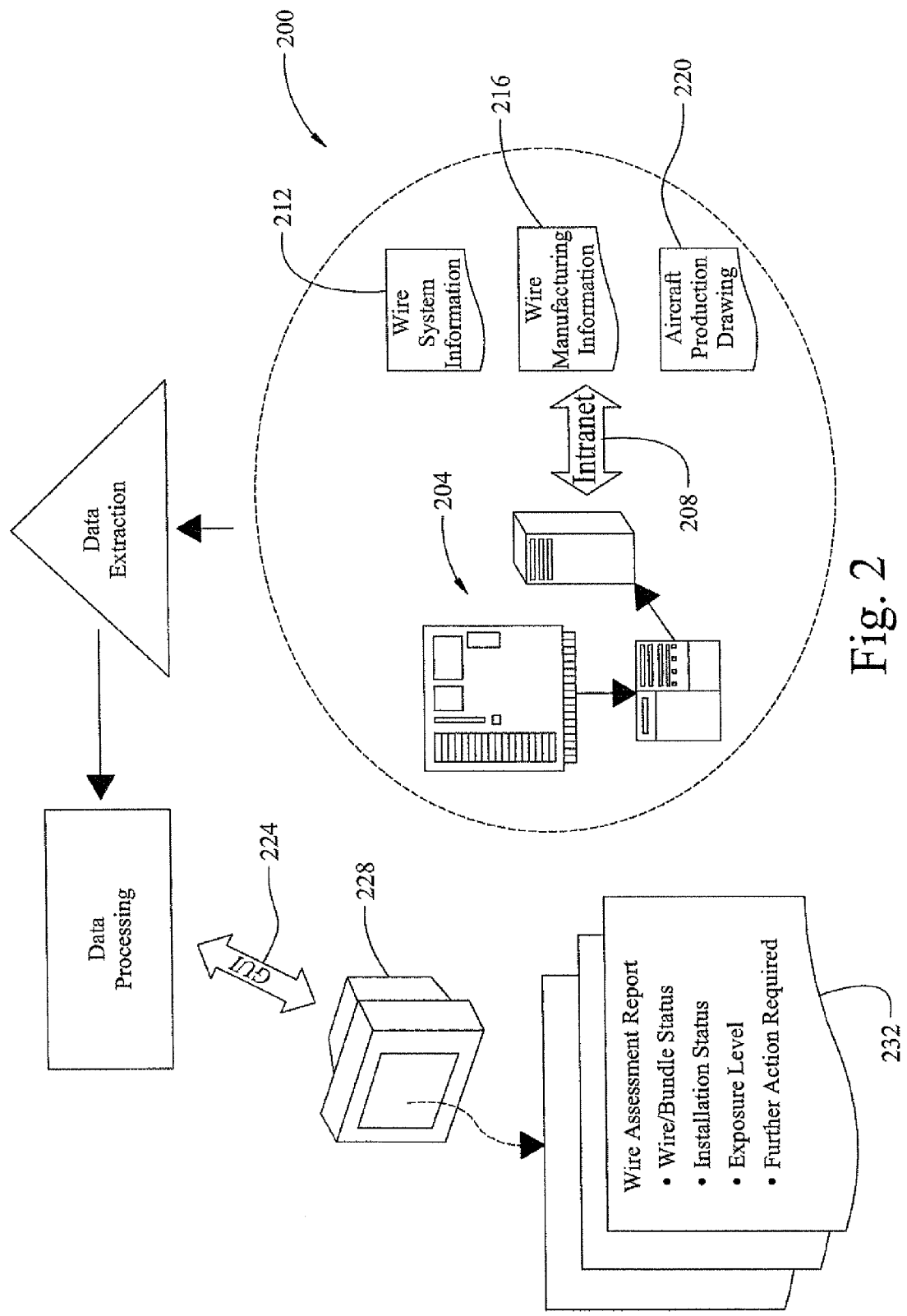
FIG. 2 is a diagram of a system for use in assessing potential conditions affecting aircraft electrical wiring systems in accordance with one implementation of the present disclosure.

One example of a system for use in performing various methods in accordance with implementation of the disclosure is indicated generally in FIG. 2 by reference number 200. The system 200 may be or be included in an enterprise system, e.g., used by an aircraft manufacturer and/or aircraft operator. The system 200 includes one or more processors and memory, indicated collectively by reference number 204. One or more databases relating, e.g., to aircraft wiring and wiring installation reside in or are available through the processor(s)/memory 204. Although the system 200 is shown as including an intranet 208, an internet could also or alternatively be used. It will be appreciated by those knowledgeable in the art that many types and configurations of processors, memory, input/output devices and networks could be used in various implementations. The system 200 uses, and may be used to provide, various types of information, including but not limited to wire system information 212, wiring manufacturing information 216, and aircraft production drawing information 220. The system 200 also includes a graphical user interface (GUI) 224 via which, e.g, a user of a terminal 228 may utilize the system 200 as further described below. The system 200 may be used to output various types of information, including various reports 232. Reports 232 may include, e.g., (1) descriptions of wire characteristics, (2) database extractions of electrical wiring components and systems and their relation to relevant systems and/or ATA (Air Transport Association) chapters, (3) physical representations of wiring geometries extracted from mainframe database applications, and/or (4) failure rate probabilities extracted from aircraft in-service data and/or other sources. In some implementations, a report 232 provides a wire system safety assessment of functional and physical aspects of aircraft wiring.

Figures 3A, 3B:
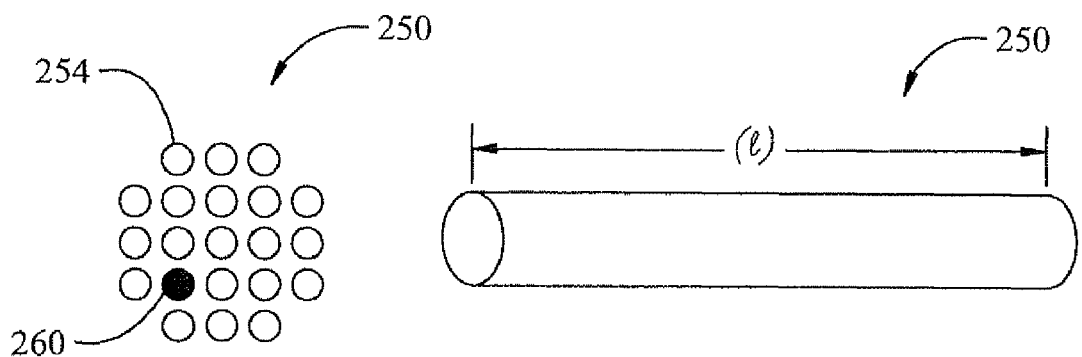
FIG. 3A is an end view of a common geometry wire bundle.
FIG. 3B is a side view of the bundle shown in FIG. 3A.
Figure 3C:
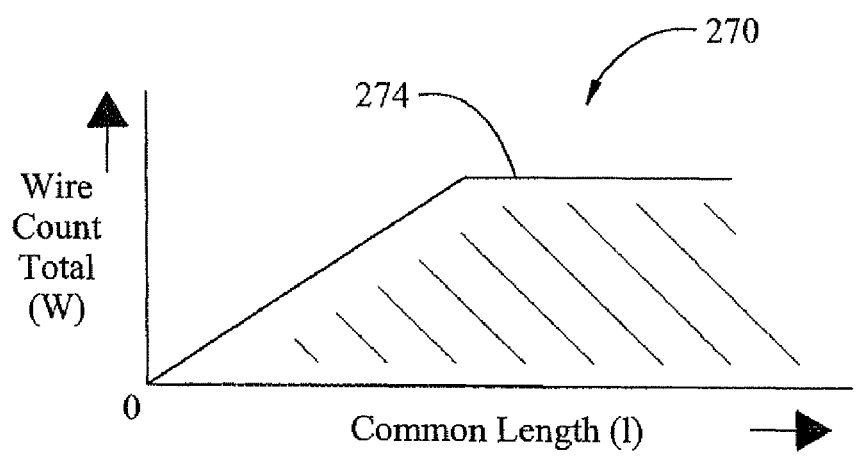
FIG. 3C is a graph of exposure level as a function of common length, wire count, and potential threat in accordance with one implementation of the present disclosure.

As previously mentioned, various quantitative probabilistic and statistical methods and/or qualitative assessments may be used to determine levels of wire exposure to hazard. For example, wire and/or wire bundle geometries may be considered in radial and/or transverse directions and a probabilistic quantitative assessment of hazard effects may be developed. An arrangement of wires in an exemplary common geometry is indicated generally in FIGS. 3A and 3B by reference number 250. One exemplary method of determining probability of hazardous wire(s) in the common geometry 250 shall be described with reference to FIGS. 3A-C. The common geometry 250 is a bundle of wires 254. The wire bundle 250 has a length l and a wire-count total w. The width w is derived, e.g., from a wire bundle data list. The length l is derived, e.g., from a wire bundle layout model. A wire 260 for which a failure condition might prevent the continued safe flight and landing (CSFL) of the aircraft is included in the bundle 250. It is assumed that: (1) at any given point in the common geometry, a hazardous wire may contact the wire 260; (2) as the length of a bundle increases, so does the exposure to hazard; and (3) as the total number of wires in a bundle increases, the possibility of exposure of the wire 260 to hazard decreases. (4) Data can be developed to establish ratios of potential threat to total wire counts. Exposure level then can be expressed as a function of (2), (3) and (4) above. Accordingly, a graph of common geometry length l relative to wire count total w is indicated generally in FIG. 3C by reference number 270. A curve 274 may be used as a safety threshold, e.g., for use in determining whether a need exists for further evaluation of a given wiring system component. In the present example, data values above the curve 274 would not require further safety analysis. It should be noted that the foregoing example illustrates only one of various types of probabilistic analysis that could be performed to provide a safety assessment of electrical wiring systems.

Figure 4A:
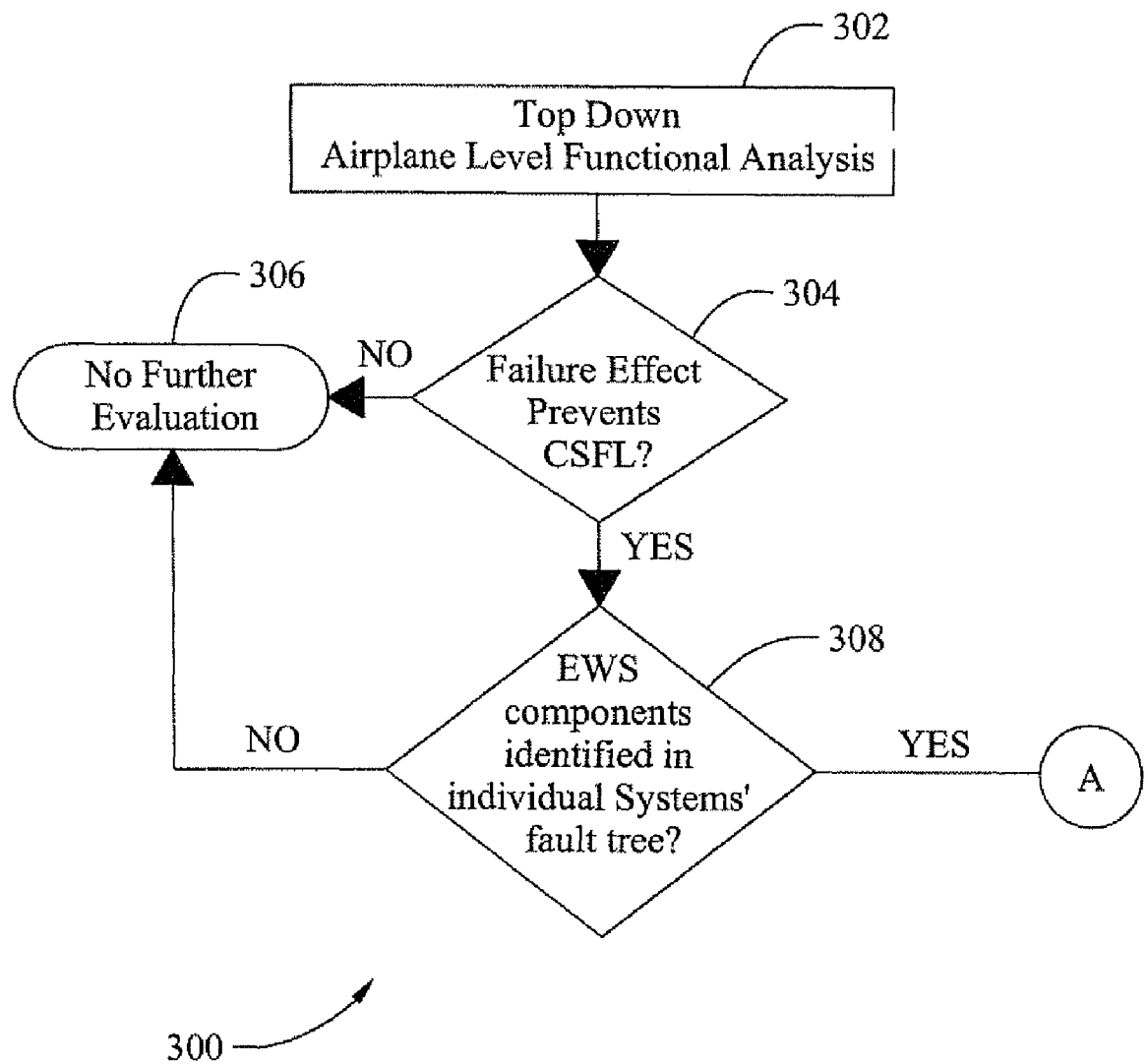
FIGS. 4A-4C are a flow diagram of a method of identifying and assessing potential conditions affecting aircraft electrical wiring systems in accordance with one implementation of the present disclosure.
Figure 4B:
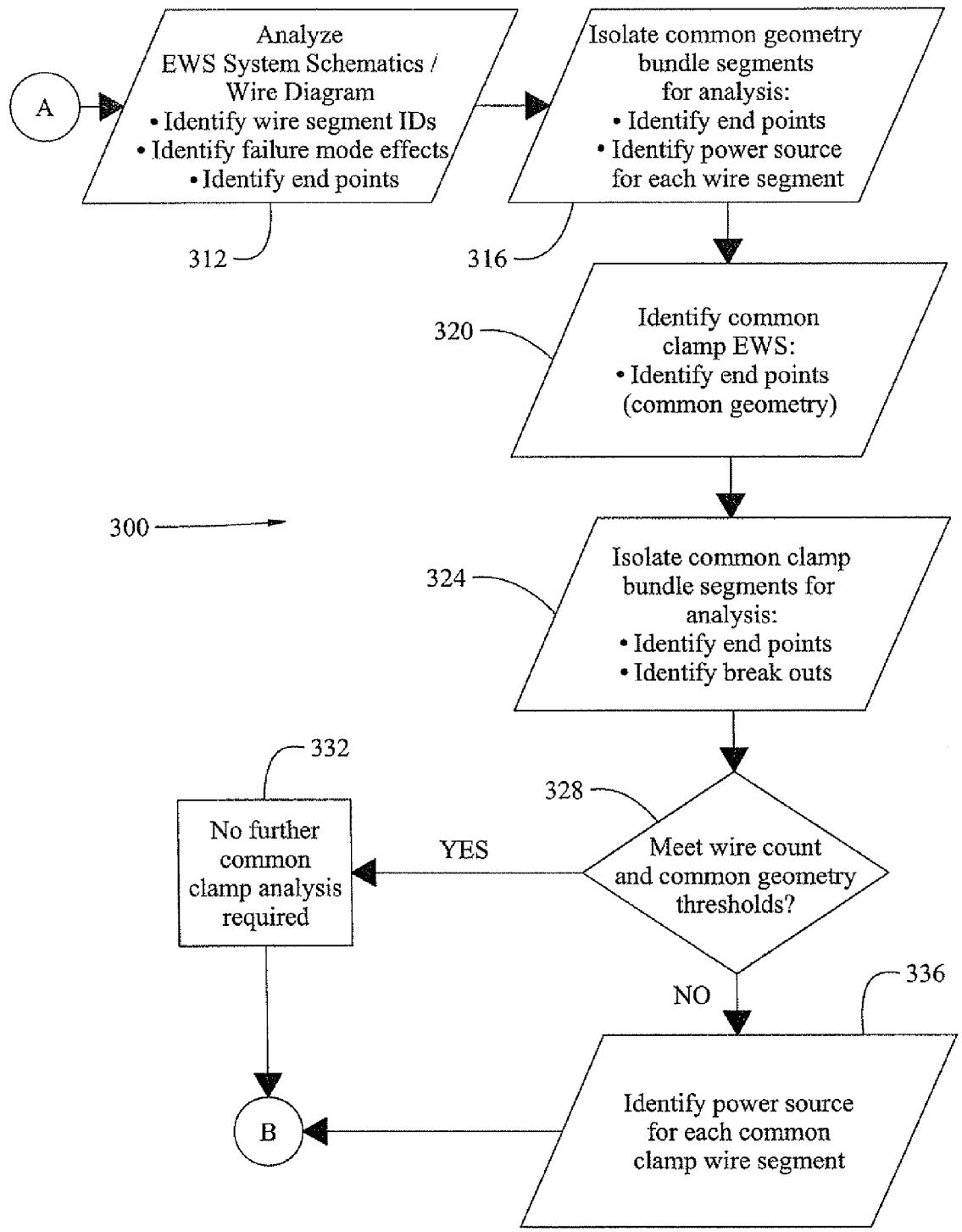
Figure 4C:
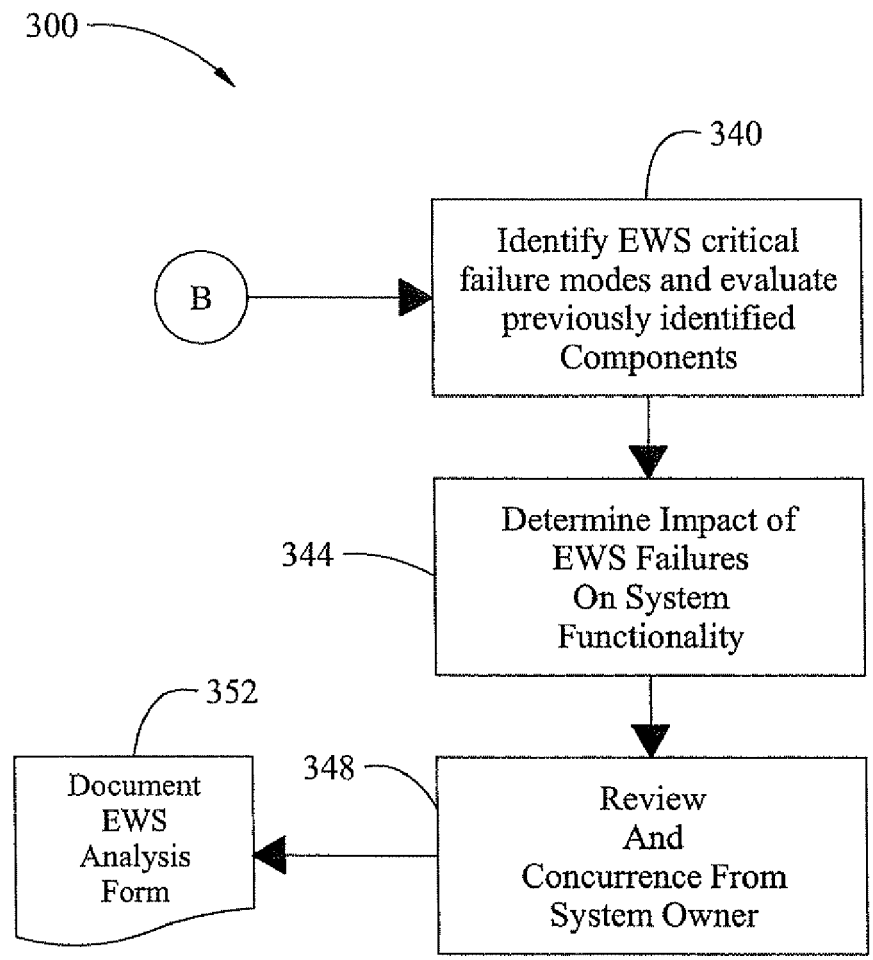

A flow diagram of one implementation of a method of assessing aircraft wiring conditions in accordance with the disclosure is indicated generally in FIGS. 4A-4C by reference number 300. The method 300 may be performed, for example, in connection with obtaining certification of a transport aircraft. A system the same as or similar to the system 200 may be used in performing the method 300.

In process 302, a top-down aircraft-level functional analysis is performed. This analysis may have been previously performed, for example, in accordance with FAA regulations for certification and operations of transport category airplanes. For this process, a functional hazard assessment (FHA) or other hazard assessment methodology is performed at the aircraft level. In the performance of a FHA, potential functional failure conditions for each system may be identified, along with potential effects of such failure conditions, in a system safety analysis (SSA) for that system. Hazards associated with specific failure conditions are classified and included in the SSA.

In process 304 it is determined, for each system and for each identified potential functional failure condition, whether effects of the condition would prevent the continued safe flight and landing (CSFL) of the aircraft. If the identified condition would not prevent CSFL, then in process 306 the identified condition is dropped from further evaluation. If the identified condition is classified as having effects preventing CSFL, then in process 308 the condition is further evaluated.

In process 308 each system failure condition is identified in which one or more electrical wiring system components are identified. Input to process 308 may include a list of the conditions identified in process 304 and one or more types of numerical probability analyses such as a system fault tree associated with the listed conditions. Other or additional methods, e.g., reliability block diagrams, could be used in identifying failure conditions involving electrical wiring system components. If no electrical wiring system components are identified in process 308 for a given condition, then in process 306 the condition is dropped from further evaluation. Output of process 308 includes the individual electrical wiring system components, identified for further evaluation.

In processes 312 through 344, electrical wiring system analysis is performed, results of which may be documented, e.g., on an analysis form for use in documenting compliance with certification regulations. In process 312, aspects of the electrical wiring system under consideration are investigated using electrical wiring system definitional material that may include, e.g., architectural block diagrams, connectivity drawings, electrical schematics and wire diagrams. Such materials, which may, e.g., be maintained in one of more database of the system 200, may be used to identify wire segment IDs, failure mode effects, end points, etc.

In process 316 common geometry bundle segments determined to be a potential hazard are isolated for analysis. More specifically, physical characteristics of wires, bundles, and/or groups of wires that have common routing, connections and/or end points are analyzed. Common clamp bundles may be identified by a review of bundle installation drawings. Segments within such bundles may be identified by a review of wire bundle list data available, e.g., in a published wire diagram manual. For each wire segment in a common geometry bundle, end points and a power source are identified. End points are identified respectively at the power source and powered equipment. Input to process 316 may include information in the analysis form, wire bundle data list (WBDL) information, and wire bundle layout model (WBLM) information.

In process 320, information on the analysis form and wiring bundle installation information may be used to identify wire bundles in common clamps. Wire bundles so identified are not limited to those associated with the electrical wiring system under investigation. Further analysis of bundles in a common geometry may be performed in physical analysis as further described below. In process 324, end points and breakouts of wire segments in common clamp bundles are isolated to provide a list of common clamp/common geometry bundles as previously described.

In process 328, common clamp bundle wire segments are analyzed to determine whether they meet predefined thresholds for safety. In the present exemplary implementation, safety thresholds for wire quantity and length are predefined on a statistical or probabilistic basis, e.g., as described with reference to FIGS. 3A-3C. The list of common clamp bundles, wire bundle layout model (WBLM) information, and wire bundle data list (WBDL) information are used as input to determine whether the given common clamp bundle (s) meet the predefined wire count and common geometry safety thresholds. If the given bundle(s) meet the thresholds, then in process 332 it is determined that no further common clamp analysis need be performed. If the given common clamp bundle(s) do not meet the safety thresholds, then in process 336 a power source is identified for each wire segment in the common clamp bundle(s).

In process 340, wire bundle segments determined in process 328 not to meet safety thresholds (in other words, determined to be potentially hazardous) are analyzed. Failure modes of the segments determined from the data identified in process 312 that are deemed critical are identified and, in process 344, are evaluated for effects on system safety by the associated electrical wiring system.

In process 344 the impact of the functional and physical failures on system functionality are determined. In process 348, review and concurrence is obtained from an owner of a system subjected to the foregoing assessment. In process 352 the analysis is updated to reflect the owner's review and concurrence. An exemplary functional safety assessment summary form is indicated generally in FIG. 5 by reference number 400. Wire failure effects 404 may have been obtained from a top-down FHA as previously discussed with reference to FIGS. 4A-4C. The form 400 includes assessment of wires 408 for safety in accordance with failure criteria 412, which include (1) system/component-level review, (2) common geometry/wire count safety thresholds, and (3) statistical rates as previously described.

Figure 6A:
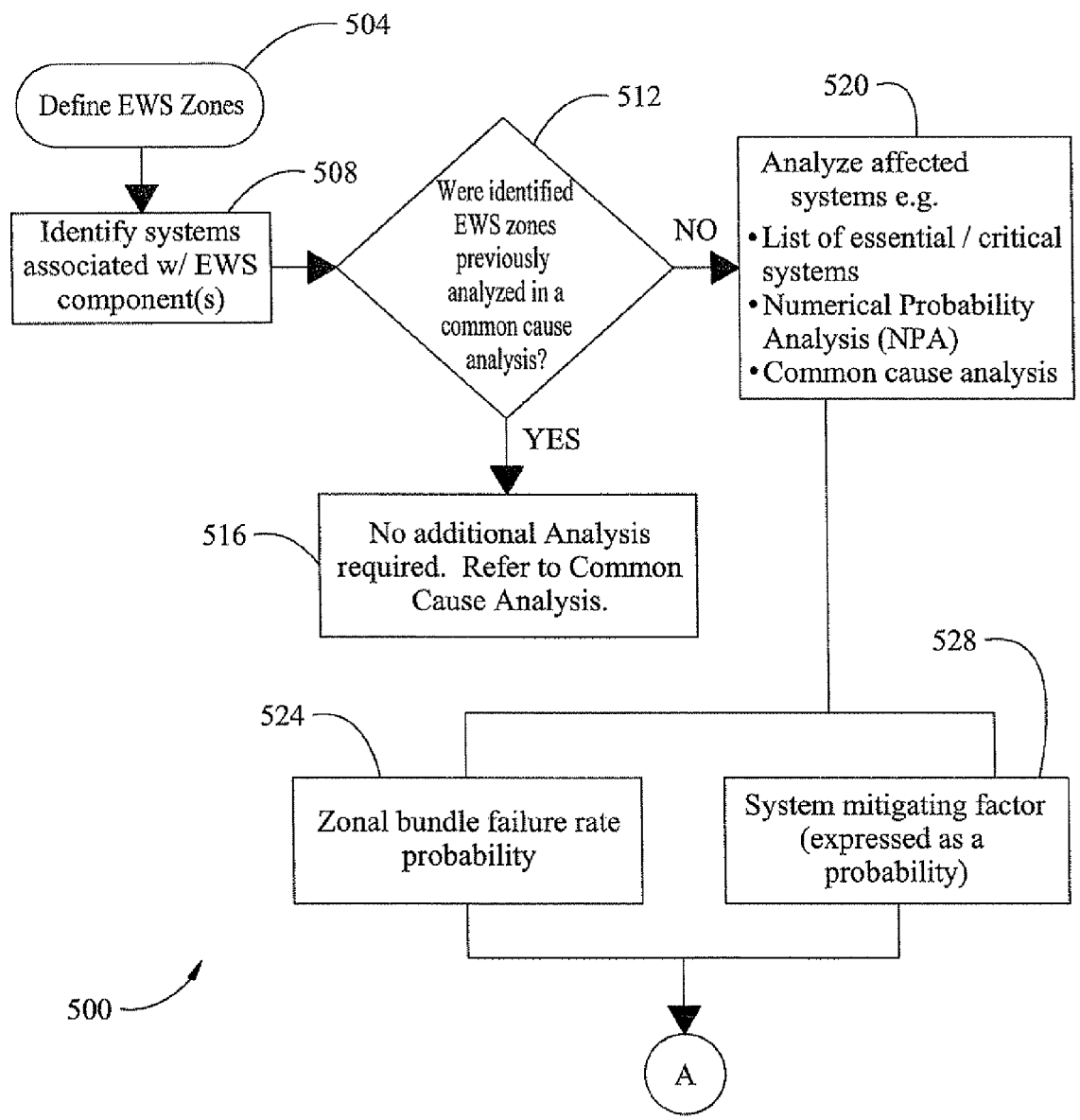
FIGS. 6A and 6B are a flow diagram of a method of performing physical analysis relative to electrical wiring systems in accordance with one implementation of the present disclosure.
Figure 6B:
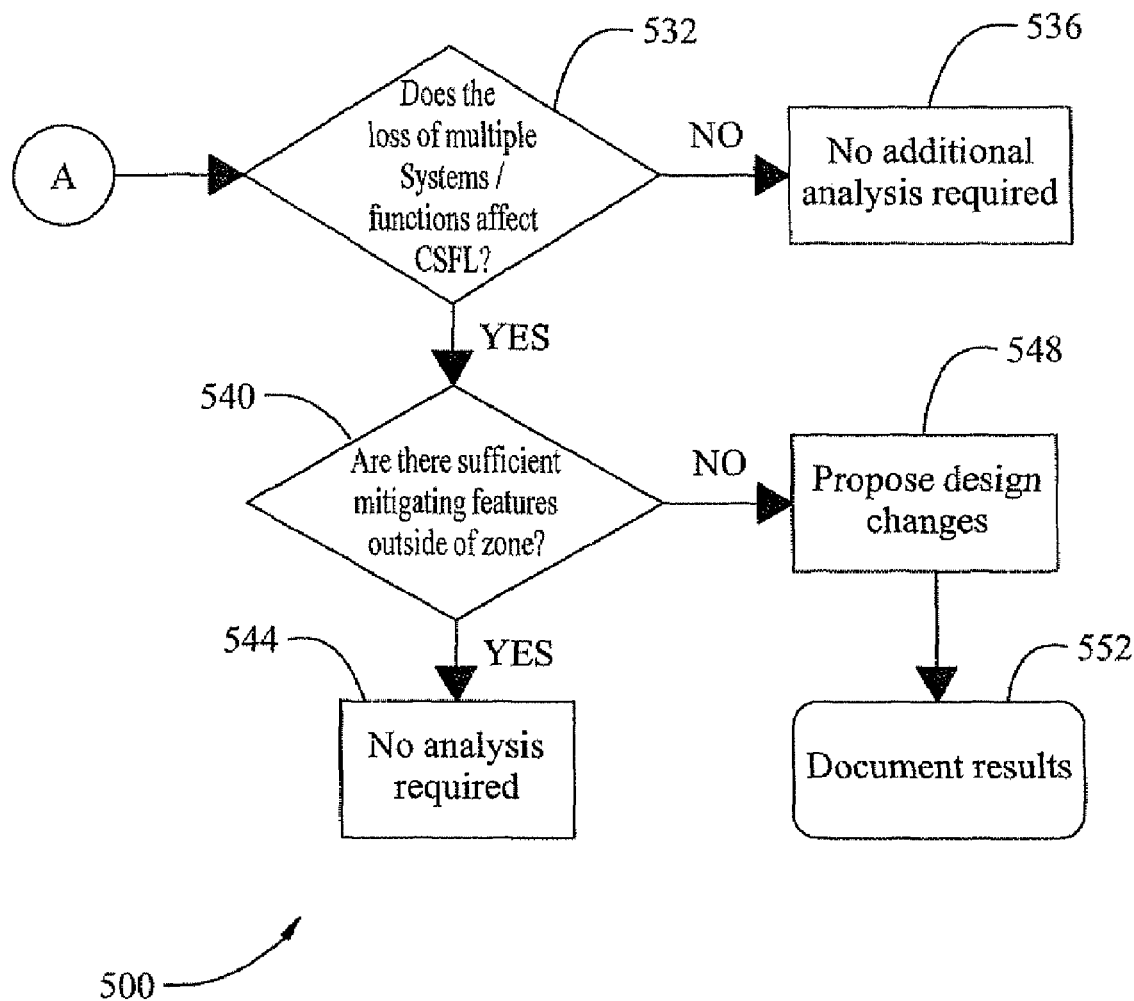

Additionally or alternatively, physical analysis of electrical wiring systems may be performed, e.g., to determine aircraft-level effects of physical failures and their criticality. In various implementations, in-service data for a wire bundle and/or for a zone is used in checking against safety thresholds. Physical analysis may be performed in accordance with an exemplary method indicated generally in FIG. 6A-6B by reference number 500. In process 504, electrical wiring system zone(s), e.g., a vertical tail and rudder or an electronics bay, are defined for analysis. In process 508, systems in the defined zone(s) are identified that are associated with electrical wiring system components. For example, if a defined zone is a vertical tail, wiring systems for actuators, pumps sensors, etc. are identified. In process 512 it is determined whether the identified zones were previously analyzed in a common cause analysis. For example, an analysis may have been previously performed to analyze effects of lightning strikes to a vertical tail. Results of analysis for common threat events in previously evaluated zones, at the airplane level, are applicable to electrical wiring system analysis and require no further review. In such case, in process 516 it is determined that the common cause analysis is sufficient physical analysis. Accordingly, no additional physical analysis is required.

If no previous common cause analysis was performed, then in process 520 affected systems are analyzed. For example, a list is obtained of systems essential and/or critical to flight safety. Functions necessary for CSFL are identified in the aircraft-level FHA. Combinations of essential systems failures, and/or addition of new non-essential systems, may affect CSFL. Numerical probability analysis (NPA) may be performed as to affected systems using a fault tree. Additionally or alternatively, common cause analysis may be performed.

In process 524, zonal bundle failure rate data is used to determine a zonal bundle failure rate probability. Failure rates typically are very small, e.g., having an average rate of about 6E-6. In process 528, probabilities are developed (e.g., from in-service data) to define factors associated with various mitigation methods such as redundancy, symmetry, and/or mechanical separation. In such manner, a system mitigation factor may be determined and expressed as a probability. The probabilities for zonal bundle failure rate and mitigation factor may be combined to obtain an overall probability that can be used, e.g., as a threshold for evaluating effects of failure in CSFL.

In process 532 the probability(s) obtained in processes 524 and 528 are used, e.g., combined, to determine whether a loss of multiple systems and/or functions would affect CSFL. If not, then in process 536 it is determined that no additional analysis is required. If CSFL would be affected, it is determined in process 540 whether there are features outside the zone of interest that would be sufficient to mitigate such loss. For example, system redundancy could be provided; a wire could be protected by putting it in a conduit; non-flammable liquids could be used in the zone; etc. If such features are provided, then in process 544 it is determined that no additional analysis is required. Otherwise, in process 548 changes in design may be proposed. In process 552 results of the foregoing analysis may be provided.

The foregoing methods may be used, e.g., by aircraft manufacturers, repair and modification stations, and/or parts manufacturers wishing to demonstrate compliance with federal aircraft safety regulations. The foregoing use of probabilistic, statistical and/or analytical methods to determine exposure of wire segments makes it possible to bound a given analysis, making it unnecessary to individually analyze every wire in a given system. Effects of a given failure can be assigned appropriate probability requirements based on a level of criticality of the failure.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of assessing potential conditions affecting electrical wiring systems of an aircraft, the method comprising:
   identifying one or more electrical wiring system components potentially affected by a potential failure condition of the aircraft;
   determining exposure of one or more wire segments of the identified wiring system components to hazard and whether the exposure meets a predefined safety threshold, the determining performed using one or more probabilistic and/or statistical methods;
   evaluating effects of one or more potential failure modes of the one or more segments on a system safety assessment for the electrical wiring systems;
   determining a zonal bundle failure rate probability;
   determining a system mitigating factor; and
   combining the zonal bundle failure rate probability and the system mitigating factor to obtain a zonal safety threshold.

2. The method of claim 1, further comprising predefining the safety threshold based at least in part on a common length and wire count of a common geometry.

3. The method of claim 1, wherein the potential failure condition includes a functional failure.

4. The method of claim 1, further comprising identifying a power source for each wire segment not meeting the predefined safety threshold.

5. The method of claim 1, wherein the potential failure condition includes a physical failure.

6. The method of claim 1, further comprising:
   identifying end points and a power source for each wire segment having a common geometry in a bundle; and
   identifying end points and breakouts for each wire segment in a given clamp.

7. A method of assessing potential conditions affecting electrical wiring systems of an aircraft, the method comprising:
   identifying one or more electrical wiring system components potentially affected by a potential failure condition of the aircraft;
   determining one or more probabilities of exposure of one or more wire segments of the one or more components to hazard;
   using the one or more probabilities to identify one or more wire segments not meeting one or more predefined safety thresholds;
   evaluating effects of one or more potential failure modes of the one or more identified segments on a system safety assessment for the electrical wiring systems;
   determining a zonal bundle failure rate probability;
   determining a system mitigating factor; and
   combining the zonal bundle failure rate probability and the system mitigating factor to obtain a zonal safety threshold.

8. The method of claim 7, wherein the potential failure condition includes a functional failure.

9. The method of claim 7, wherein determining one or more probabilities of exposure comprises identifying end points and a power source for each wire segment having a common geometry in a bundle.

10. The method of claim 7, wherein determining one or more probabilities of exposure comprises identifying end points and breakouts for each wire segment in a given clamp.

11. The method of claim 7, further comprising identifying a power source for each wire segment not meeting the one or more predefined safety thresholds.

12. The method of claim 7, wherein the potential failure condition includes a physical failure.

13. A method of assessing potential conditions affecting electrical wiring systems of an aircraft, the method comprising:
   identifying one or more electrical wiring system components potentially affected by a potential failure condition of the aircraft;
   analyzing one of the components to identify one or more potentially affected wire bundles;
   isolating wire segments of the one or more bundles for analysis as to potential exposure to hazard;
   analyzing the isolated segments to determine one or more probabilities of exposure to hazard;
   using the one or more probabilities to identify one or more wire segments not meeting one or more predefined safety thresholds;
   evaluating effects of one or more potential failure modes of the one or more identified segments on a system safety assessment for the electrical wiring systems;
   determining a zonal bundle failure rate probability;
   determining a system mitigating factor; and
   combining the zonal bundle failure rate probability and the system mitigating factor to obtain a zonal safety threshold.

14. The method of claim 13, wherein the potential failure condition includes a physical failure.

15. The method of claim 13, wherein the potential failure condition includes a functional failure.

16. The method of claim 13, further comprising identifying a power source for each wire segment not meeting the predefined safety threshold.

17. The method of claim 13, further comprising predefining the safety threshold based at least in part on a common length and wire count of a common geometry.

* * * * *